United States Patent
Singh et al.

(10) Patent No.: US 8,130,737 B2
(45) Date of Patent: Mar. 6, 2012

(54) SYSTEM AND METHOD FOR A MULTIPLE HOP WIRELESS NETWORK

(75) Inventors: Harkirat Singh, Santa Clara, CA (US);
Xiangping Qin, San Jose, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 919 days.

(21) Appl. No.: 12/133,310

(22) Filed: Jun. 4, 2008

(65) Prior Publication Data

US 2009/0232049 A1 Sep. 17, 2009

Related U.S. Application Data

(60) Provisional application No. 61/036,033, filed on Mar. 12, 2008.

(51) Int. Cl.
*H04W 4/00* (2009.01)
(52) U.S. Cl. .................. 370/338; 370/400; 370/443
(58) Field of Classification Search .......... 370/254, 370/256, 338, 352, 389, 392, 400, 401, 428; 455/39; 398/76
See application file for complete search history.

(56) References Cited

U.S. PATENT DOCUMENTS

| | | | |
|---|---|---|---|
| 5,068,916 A * | 11/1991 | Harrison et al. | 455/39 |
| 5,546,190 A * | 8/1996 | Hill et al. | 398/76 |
| 6,640,087 B2 | 10/2003 | Reed et al. | |
| 6,788,670 B1 * | 9/2004 | Larsson | 370/351 |
| 2002/0121676 A1 * | 9/2002 | Chu et al. | 257/592 |
| 2003/0086404 A1 * | 5/2003 | Beckmann et al. | 370/338 |
| 2004/0233918 A1 * | 11/2004 | Larsson et al. | 370/400 |
| 2005/0143133 A1 | 6/2005 | Bridgelall | |
| 2005/0243765 A1 * | 11/2005 | Schrader et al. | 370/328 |
| 2006/0159054 A1 * | 7/2006 | Kobayashi et al. | 370/338 |
| 2007/0002876 A1 | 1/2007 | Berkman et al. | |

(Continued)

OTHER PUBLICATIONS

IEEE Standard for Information technology 802.11—Telecommunications and information exchange between systems—Local and metropolitan area networks—Specific requirements. Part 11: Wireless LAN Medium Access Control (MAC) and Physical Layer (PHY) specifications, IEEE Computer Society, 1232 pages, (Jun. 12, 2007).

(Continued)

*Primary Examiner* — Andrew Lai
(74) *Attorney, Agent, or Firm* — Kenneth L. Sherman, Esq.; Michael Zarrabian, Esq.; Myers Adras Sherman & Zarrabian LLP

(57) ABSTRACT

A system and method for wireless communication over a multi-hop network are disclosed. One embodiment of the system includes an access point and a plurality of wireless devices. Each of the access point and the plurality of wireless devices includes a high-rate module to send or receive data over a high-rate wireless channel having a first frequency; and a low-rate module to send or receive one or more control signals over a low-rate wireless channel having a second frequency lower than the first frequency. The low-rate modules of the wireless devices are configured to send information for establishing a multi-hop data route to the access point via the low-rate wireless channel. The access point is further configured to broadcast the information over the multi-hop wireless network via the low-rate wireless channel. This configuration efficiently disseminates the information over the network.

42 Claims, 13 Drawing Sheets

U.S. PATENT DOCUMENTS

| | | | |
|---|---|---|---|
| 2007/0099668 A1 | 5/2007 | Sadri et al. | |
| 2007/0104199 A1* | 5/2007 | Taha | 370/392 |
| 2008/0096560 A1 | 4/2008 | Felske et al. | |
| 2010/0014458 A1 | 1/2010 | Singh et al. | |

OTHER PUBLICATIONS

Cianca et al., Location/Situation-Aware Architecture for Mobility Management over Heterogeneous Networks, Proceedings of the 2nd International Conference on Mobile Multimedia Communications, 2006, 6 pages.

IEEE 802.11 Standard for Information technology—Telecommunications and information exchange between systems-Local and metropolitan area networks-Specific requirements. Part 11: Wireless LAN Medium Access Control (MAC) and Physical Layer (PHY) specifications, IEEE Computer Society, pp. 87-140, 146-148, 456-461, (Jun. 12, 2007).

IEEE P802.11nTM/ D3.00, Draft Standard for information technology-Telecommunications and information exchange between systems-Local and metropolitan area networks-Specific requirements-Part 11: Wireless LAN Medium Access Control (MAC) and Physical Layer (PHY) specifications: Amendment 8: Medium Access Control (MAC) Quality of Service Enhancements IEEE, 2005, pp. 1-211.

IEEE P802.11zTM/ D1.0, Draft Standard for information technology-Telecommunications and information exchange between systems-Local and metropolitan area networks-Specific requirements-Part 11: Wireless LAN Medium Access Control (MAC) and Physical Layer (PHY) specifications: Amendment 7: Direct Link Setup, IEEE, Mar. 2008, pp. 1-36.

Poroor et al., Fast Dual-Radio Cross-Layer Handoffs in Multi-Hop Infrastructure-mode 802.11 Wireless Networks for In-Vehicle Multimedia Infotainment, IEEE ANTS 2008, 3 pages.

Vaios et al., Increasing Capacity in Dual-Band WLANS Through AD-HOC Networking, University of Athens, Department of Informatics & Telecommunications, International Journal of Wireless and Mobile Computing (IJWMC), Special Issue on Wireless Ad Hoc Networking, 2005, 13 pages.

"A 5/60GHz hybrid system concept," *IST Broadway*, 12 pages; available at www.ist-browadway.org/documents/broadway-broadband_air_interfaces_cluster.pdf (last visited on Apr. 24, 2008).

"Evaluation of centralized adhoc network architecture (CANA)," BAI cluster workshop 2004-03, Marc de Courville and all, IST BroadWay project, Jun. 1, 2004, 17 pages.

Draves et al., "Routing in multi-radio, multi-hop wireless mesh networks," 15 pages, MobiCom '04, Sep. 26-Oct. 1, 2004.

IEEE P802.11n ™/ D3.00, Draft Standard for information technology-Telecommunications and information exchange between systems-Local and metropolitan area networks-Specific requirements-Part 11: Wireless LAN Medium Access Control (MAC) and Physical Layer (PHY) specifications: Amendment 4: Enhancements for Higher Throughput, *IEEE*, 2007.

Heinzelman et al., "Energy efficient communication protocol for wireless microsensor networks," *Proc. The 33rd Hawaii International Conference on System Science*, Hawaii, U.S.A., Jan. 2000.

Iannone et al., "Can multi-rate radios reduce end-to-end delay in mesh networks? A simulation case study," *Mesh Networking: Realizing the Wireless Internet (Meshnets)*. Jul. 2005.

Ramachandran et al., "Interference-aware channel assignment in multi-radio wireless mesh networks", *Infocom 2006*.

Ros et al., "Cluster-based OLSR extensions to reduce control overhead in mobile Ad hoc networks," *International wireless Communications and Mobile Computing Conference (IWCMC 2007)* Department of Information and Communications Engineering, University of Murcia, pp. 202-207, Aug. 12-16, 2007, Honolulu Hawaii, U.S.A.

Villasenor-Gonzalez et al., "HOLSR: A hierarchical proactive routing mechanism for mobile Ad hoc networks," *IEEE Communications Magazine* (Jul. 2005).

Madhow, U., "MultiGigabit Millimeter Wave Communication: System Concepts and Challenges," Proceedings of the 2008 Information Theory and Applications Workshop, IEEE, Jan. 27, 2008-Feb. 1, 2008, pp. 193-196, United States.

\* cited by examiner

SYSTEM AND METHOD FOR A MULTIPLE HOP WIRELESS NETWORK

RELATED APPLICATION

This application claims priority from U.S. Provisional Patent Application No. 61/036,033, filed on Mar. 12, 2008, which is incorporated herein by reference.

BACKGROUND OF THE INVENTION

1. Field of the Invention

The present invention relates to wireless networks, and in particular, to data transmission in a multi-hop wireless network.

2. Description of the Related Technology

As a demand for wireless transmission of a high volume of data increases, various wireless communication technologies have been developed to support a high data transmission rate. Certain wireless systems use a high-rate channel for increasing a data transmission rate. For example, wireless systems based on a version of IEEE 802.11 standard (e.g., IEEE 802.11n) use a 2.4 GHz or 5 GHz bandwidth, and can support a data transmission rate of up to 600 Mbps. Other wireless systems using a 60 GHz bandwidth can support a data transmission rate of up to 5 Gbps.

As the frequency of a channel increases, the transmission range of the channel decreases. In addition, a high-rate channel is generally susceptible to obstruction by moving or stationary objects between wireless devices using the channel. Thus, data transmission using such a high-rate channel may be limited to a network covering a small open area.

Certain wireless networks need to cover a wider area than an area that such high-rate channels can cover while supporting a high data transmission rate. In addition, there is a need for a scheme that can reduce high-rate channels' susceptibility to obstruction by objects.

SUMMARY OF CERTAIN INVENTIVE ASPECTS

One inventive aspect is a wireless device for data transmission. In one embodiment, the device comprises a transmitter configured to wirelessly communicate with an access point and a plurality of other wireless devices, wherein the access point, the wireless device, and the plurality of other wireless devices form at least part of a multi-hop wireless network. The transmitter comprises: a first module configured to send data over a first wireless channel having a first frequency and a first range; and a second module configured to send one or more control signals over a second wireless channel having a second frequency lower than the first frequency. The second wireless channel has a second range greater than the first range. The second module is further configured to send information to the access point via the second wireless channel. The information includes a request for broadcasting at least part of the information over the multi-hop wireless network.

In another embodiment, there is a wireless device for data transmission that comprises a receiver configured to wirelessly communicate with an access point and a plurality of other wireless devices. The access point, the wireless device, and the plurality of other wireless devices form at least part of a multi-hop wireless network. The receiver comprises: a first module configured to receive data over a first wireless channel having a first frequency and a first range; and a second module configured to receive one or more control signals over a second wireless channel having a second frequency lower than the first frequency. The second wireless channel having a second range longer than the first range. The second module is further configured to receive information on the multi-hop wireless network from the access point via the second wireless channel.

In yet another embodiment, there is a device for wireless data communication. The device comprises an access point configured to wirelessly communicate with a plurality of wireless devices, wherein the access point and the plurality of wireless devices form at least part of a multi-hop wireless network. The access point is further configured to exchange data with another access point of another network via a wired or wireless backbone. The access point comprises: a first module configured to send or receive data over a first wireless channel having a first frequency and a first range; and a second module configured to send or receive one or more control signals over a second wireless channel having a second frequency lower than the first frequency. The second wireless channel has a second range longer than the first range. The second module is further configured to receive information from one of the wireless devices via the second wireless channel. The second module is further configured to broadcast the information over the multi-hop wireless network via the second wireless channel.

In yet another embodiment, there is a method of wireless communication. The method comprises generating information by a first module of a wireless device. The first module is configured to process data for transmission over a first wireless channel having a first frequency and a first range. The information includes a request for broadcasting at least part of the information to a plurality of other wireless devices. An access point, the wireless device, and the plurality of other wireless devices form at least part of a multi-hop network. The method also includes transmitting, by a second module of the wireless device, the information to the access point over a second wireless channel having a second frequency lower than the first frequency. The second wireless channel has a second range longer than the first range.

In yet another embodiment, there is a method of wireless communication. The method comprises receiving, by an access point, information over a first wireless channel having a first frequency and a first range. The access point is configured to communicate data with at least one of a plurality of wireless devices over a second wireless channel having a second frequency higher than the first frequency and a second range shorter than the first range. The access point and the plurality of wireless devices form at least part of a multi-hop wireless network. The access point is further configured to exchange data with another access point of another network via a wired or wireless backbone. The information originates from one of the wireless devices. The method also includes transmitting, by the access point, the information to substantially all of the wireless devices over the first wireless channel.

In yet another embodiment, there is a wireless network comprising an access point configured to exchange data with another access point of another network via a wired or wireless backbone; and a plurality of wireless devices configured to wirelessly communicate with one another and with the access point. The access point and the plurality of wireless devices form at least part of a multi-hop wireless network. Each of the access point and the plurality of wireless devices comprises: a first module configured to send or receive data over a first wireless channel having a first frequency and a first range; and a second module configured to send or receive one or more control signals over a second wireless channel having a second frequency lower than the first frequency. The second wireless channel has a second range longer than the first range. The second module of at least one of the wireless devices is further configured to send information to the access point via the second wireless channel. The access point is further configured to transmit the information over the multi-hop wireless network via the second wireless channel.

DETAILED DESCRIPTION OF CERTAIN INVENTIVE EMBODIMENTS

Figure 1:
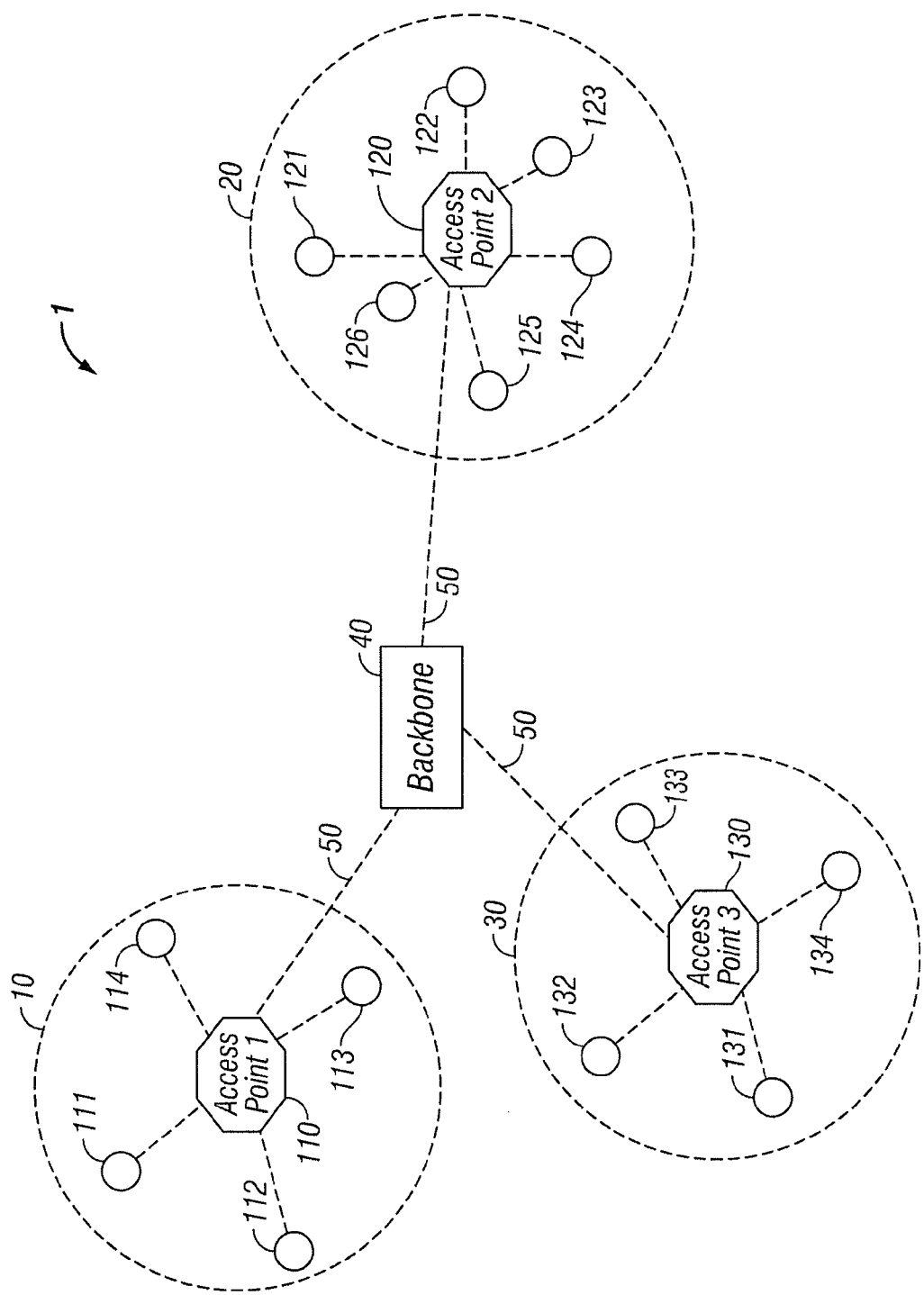
FIG. 1 is a block diagram illustrating an example wireless network including a plurality of sub-networks.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Overview of Wireless Network

Referring to FIG. 1, an example wireless network will be described below. The wireless network 1 includes a plurality of sub-networks 10, 20, 30 and a network backbone 40. The illustrated portion of the network 1 includes only three sub-networks, but a skilled technologist will appreciate that the network can include more sub-networks.

Each of the sub-networks 10, 20, 30 includes an access point 110, 120, 130 and one or more wireless stations or devices 111-114, 121-126, 131-134. Each of the access points 110-130 is capable of performing wireless communication with the one or more wireless stations within the sub-network according to a wireless communication protocol. The access points 110-130 are also connected to the network backbone 40 via wired or wireless channels 50. Each of the access points 110-130 may provide communication between stations within its respective sub-network 10-30 or between a station in its sub-network and another station in another sub-network.

The one or more wireless stations are located within a coverage region within which the access point can communicate wirelessly. The one or more stations can be electronic devices that can wirelessly connect to one or more of the access points 110, 120, 130. Examples of such electronic devices include, but are not limited to, a mobile phone, a telephone, a television, a set-top box, a computer monitor, a computer, a hand-held computer, a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, a game device, etc. In certain arrangements, one or more stations can belong to two or more sub-networks. In certain embodiments, at least one of the access points 110, 120, 130 may be part of such an electronic device.

The network backbone 40 serves to interconnect the sub-networks 10, 20, 30 to one another, providing a path for the exchange of information between them. The network backbone 40 can be connected to another backbone for communication with another network.

In one embodiment, the sub-networks 110-130 may be in compliance with the same communication protocol. In other embodiments, one of the sub-networks 110-130 may comply with a communication protocol different from the protocols of the other sub-networks. In certain arrangements, the access points and the stations may be in compliance with IEEE 802.11 standard. In one embodiment, the network 1 can form a wide area network (WAN), and each of the sub-networks 10-30 can form a local area network (LAN). In another embodiment, the network 1 can form a local area network (LAN).

Multi-Hop Network Employing High-Rate and Low-Rate Channels

In one embodiment, a multi-hop network or scheme is primarily used for data transmission to cover substantially all wireless stations in a service area while providing a high data transmission rate. In the context of this document, the term "service area" refers to an area substantially within the reach of a low-rate channel which will be described below. The term "multi-hop network" refers to a network in which a source station sends data to a destination station via one or more intermediate stations. The one or more intermediate stations may be selected by a routing algorithm. In the context of this document, the term "source station" refers to a station from which transmitted data originates, and the term "destination station" refers to a station for which the data is destined. A multi-hop network may also be referred to as an ad-hoc mesh network.

A multi-hop transmission from a source station to a destination station (hereinafter, referred to as an "end-to-end transmission") typically takes more time than a direct transmission from the source station to the destination station using the same data transmission rate as the multi-hop transmission. In addition, the routing algorithm needs information on substantially all devices on the network (hereinafter, referred to as "network information"). The network information can include, but is not limited to, the positions and transmission schedules of the stations on the network. In certain arrangements, a source station determines a route for transmitting data to a destination station. Thus, the network information needs to be shared with all the stations on the network, which may take additional time.

A certain multi-hop network may have moving stations or encounter objects blocking one or more of its channels between stations. In such instances, the network information needs to be updated and also shared with the stations on the network.

In one embodiment, each station on a multi-hop network uses both a high-rate channel and a low-rate channel. The high-rate channel may be directional and the low-rate channel may be directional or omni-directional. In certain embodiments, the low rate channel may be omni-directional as a default, and optionally directional. The channels can be directional or omni-directional by using different antenna systems. In the context of this document, the terms "directional channel" and "omni-directional channel" can be interchangeably used with "directional transmissions/reception capability" and "omni-directional transmissions/reception capability," respectively. The low-rate channel has a longer range than the high-rate channel. Each station can use the low-rate channel for broadcasting network information over substantially all stations in the network.

In some embodiments, a coordinator device (e.g., an access point) on the network may schedule concurrent high-rate transmissions that are spatially non-overlapping, based at least partly on the network information, thereby enhancing the overall end-to-end transmission rate of the network. In other embodiments, a station on the network may transmit data over either the high-rate channel or the low-rate channel, depending on the channel conditions. For example, when the directional high-rate channels that are primarily used for data transmission are blocked or face frequent outages or poor channel quality, the low-rate channel can be alternatively used for data transmission. In certain embodiments, the high-rate channel may also be used for transmitting control messages, such as neighbor discovery control messages.

Figure 2:
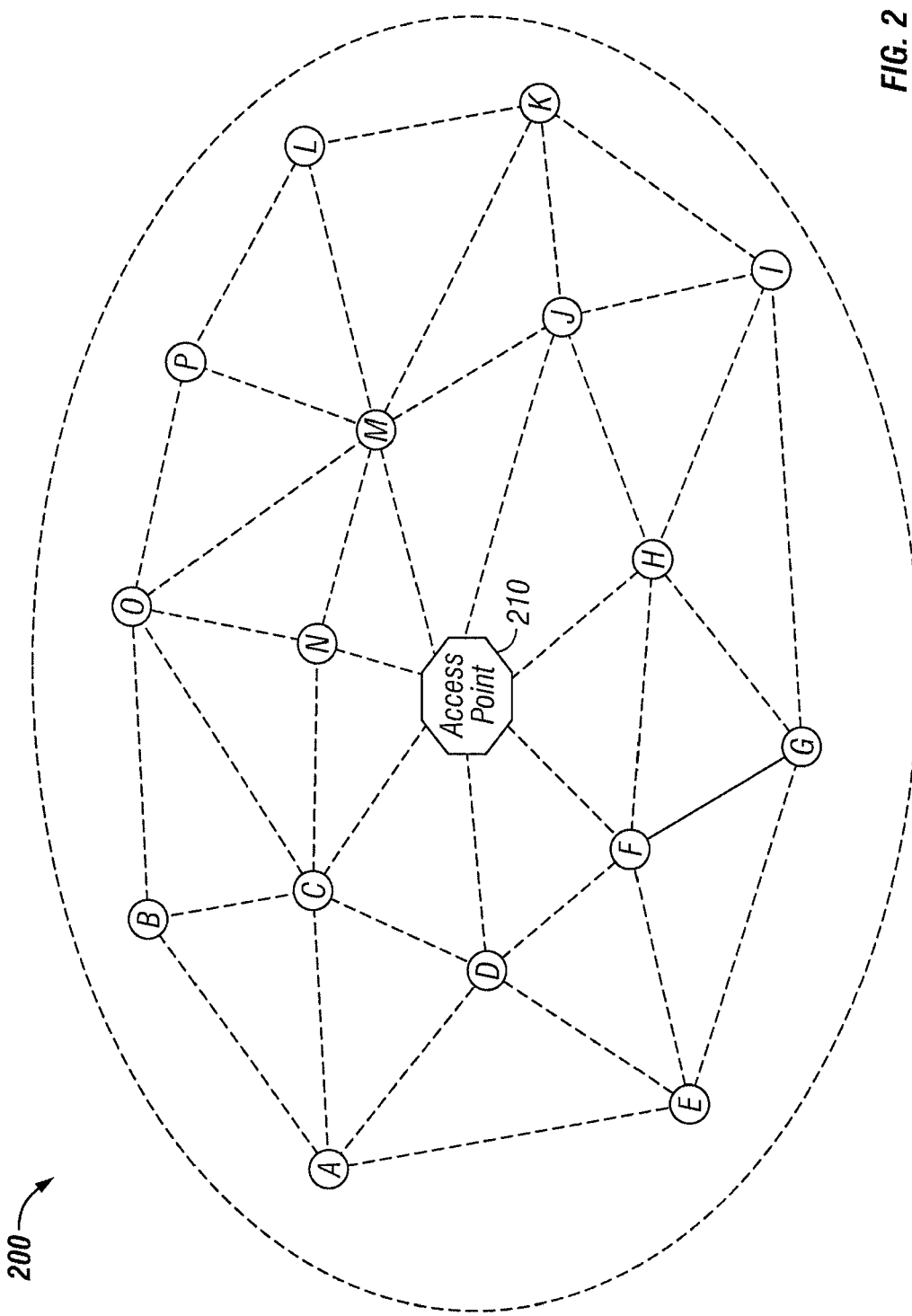
FIG. 2 is a block diagram of a wireless network employing a multi-hop transmission scheme according to one embodiment.

Referring to FIG. 2, one embodiment of a wireless network employing a multi-hop transmission scheme will be now described below. The illustrated network 200 can be one of the sub-networks 10-30 of FIG. 1. A skilled technologist will, however, appreciate that the network 200 may be part of any suitable wireless network.

The illustrated network 200 includes an access point 210 and a plurality of stations or devices A-P. The access point 210 and the stations A-P can be in wireless communication with one another via wireless channels. In one embodiment, the access point 210 can communicate with other access points in other networks. In other embodiments, the access point can only serve as a coordinator in the network without communicating with other access points in other networks. In the network 200, the communication of information (e.g., data) between source and destination stations can be carried out through a number of intermediate stations that serve to relay the information between the two stations. In certain instances, the access point 210 can serve as one of the source and destination stations.

Figure 3A:
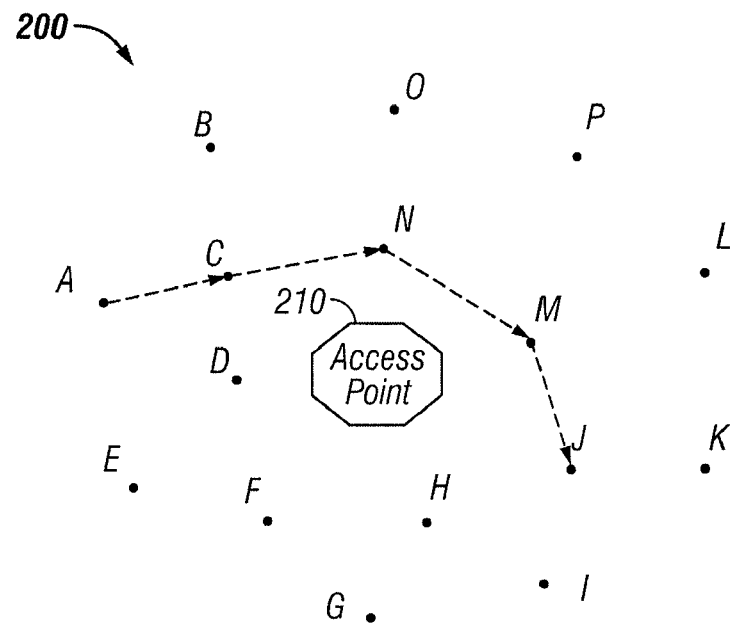
FIG. 3A is a diagram illustrating an example route for information relay between two stations according to a multi-hop transmission scheme.

Referring to FIG. 3A, for example, when a station A sends information to a station J, some of the other stations in the network 200 can relay the information from the station A to the station J. In FIG. 3A, a station C, a station N, and a station M relay the information from the station A to the station J.

Figure 3B:
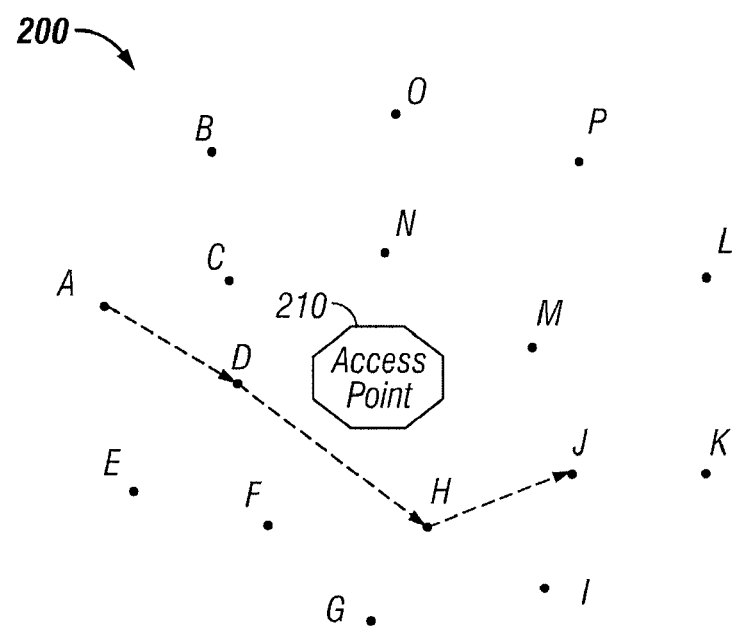
FIG. 3B is a diagram illustrating another example route for information relay between two stations according to a multi-hop transmission scheme.

The route for relaying the information can vary widely, depending on the channel conditions and availabilities of the stations. Thus, if any of the stations C, N, M that are used in FIG. 3A is not available or experiences a poor channel condition, a different relay route can be selected. For example, the station A can send the information to the station J via a station D and a station H, as shown in FIG. 3B.

In selecting a route for relaying information, a source station needs information on all the other stations in the network 200. Such information may be referred to as network information in the context of this document. The term "network information" may alternatively be referred to as a "network map." The network map can include detailed information on the locations of all the stations and their channel conditions and availabilities. The network map can also include information (such as ID, data rate, link quality, and/or state) on neighboring stations of each station. For example, the network map can indicate that a station C is neighbored by stations A, B, D, N, and O and the access point 210 in the network 200 of FIG. 2. The network map can include any other information that is needed for routing for relaying information in the network 200.

In one embodiment, the network map can be collected by the access point 210 at the start of the operation of the network 200, and can be distributed to the stations A-P on the network 200. Then, the network map can be updated at a selected time interval or when there is a change in the channel conditions or availabilities of the stations A-P. An accurate up-to-date network map can avoid stale routes that may increase end-to-end transmission delay which may adversely affect some delay sensitive applications, such as video data transmission. A skilled technologist will appreciate that various schemes can be adapted for forming and updating the network map. Other configurations of the access point 210 and the stations A-P can be as described above with respect to the configurations of the access points 110-130 and the stations 111-114, 121-126, 131-134 of FIG. 1.

Figure 4:
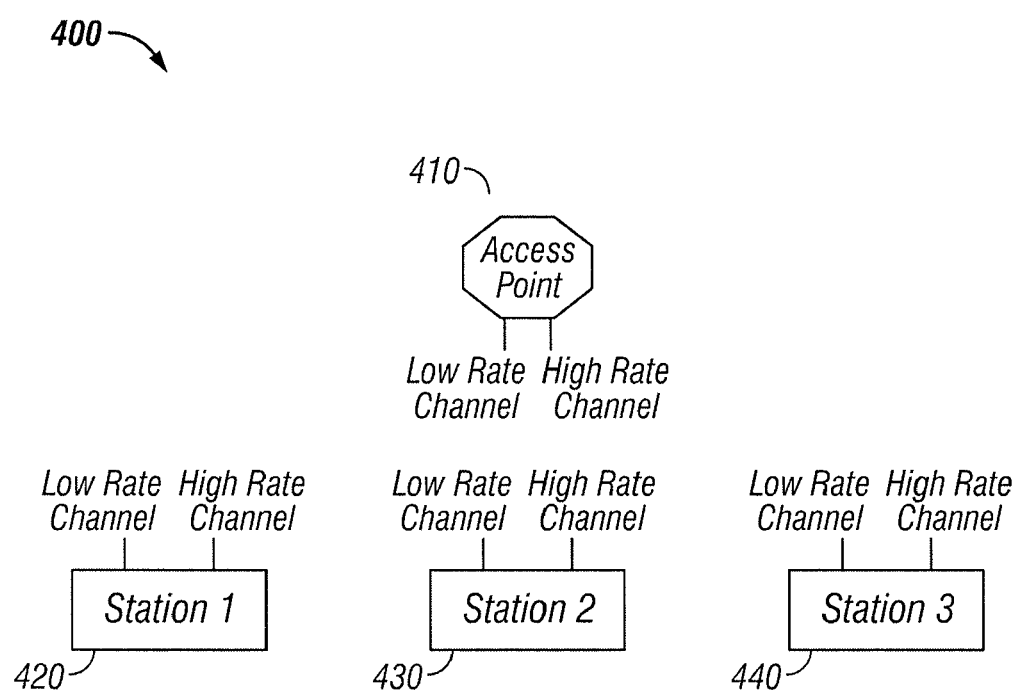
FIG. 4 is a block diagram of a wireless network including an access point and stations employing a high-rate channel and a low-rate channel according to one embodiment.

Referring to FIG. 4, a system for a multi-hop network employing multi-rate channels according to one embodiment will be now described below. The illustrated system 400 includes an access point 410 and first to third stations 420, 430, 440. The access point 410 and the stations 420-440 can communicate with one another via a low-rate channel (LRC) and a high-rate channel (HRC). Each of the access point 410 and the stations 420-440 includes two interfaces or radios for the low-rate channel and high-rate channel, respectively.

In one embodiment, the high-rate channel may have a frequency from above 6 GHz to about 300 GHz. Such a frequency may include an extremely high frequency (EHF). The high-rate channel may be a 60 GHz channel that is supported by 60 GHz millimeter-wave radio. In one embodiment, the communication range of a 60 GHz channel for an indoor environment may be of the order of 10 meters. In other embodiments, the high-rate channel can use a terahertz frequency ranging between 300 GHz and 3 THz.

Figure 5A:
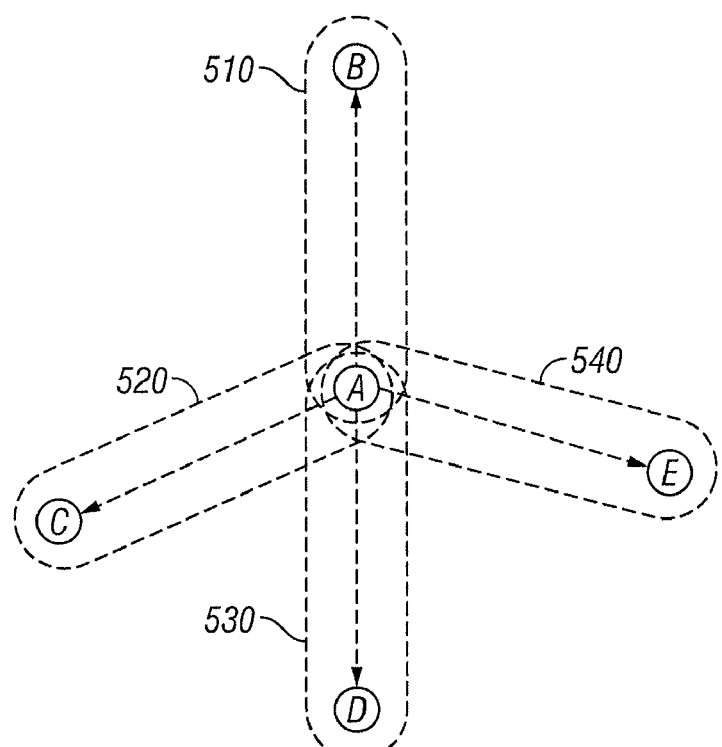
FIG. 5A is a diagram illustrating high-rate directional channels used in the network of FIG. 4.

The high-rate channel may be directional, as shown in FIG. 5A. In FIG. 5A, a station A has high-rate channels 510-540 for communication with neighboring stations B-E, respectively. When sending information to the neighboring stations B-E, the station A can send the information to only one of the stations B-E via a respective one of the high-rate channels 510-540 at a time.

The low-rate channel may be a channel having a frequency below 6 GHz. In one embodiment, the low-rate channel can be a 2.4 GHz or 5 GHz channel that can support Wireless Local Area Network (WLAN). The interface for the low-rate channel may be in compliance with IEEE 802.11. All versions of IEEE 802.11 standard are incorporated herein by reference. The low-rate channel can have a longer range than the high-rate channel. In one embodiment, the low-rate channel for an indoor environment that has a frequency lower than 6 GHz can have a range of about 20 meters to about 100 meters.

Figure 5B:
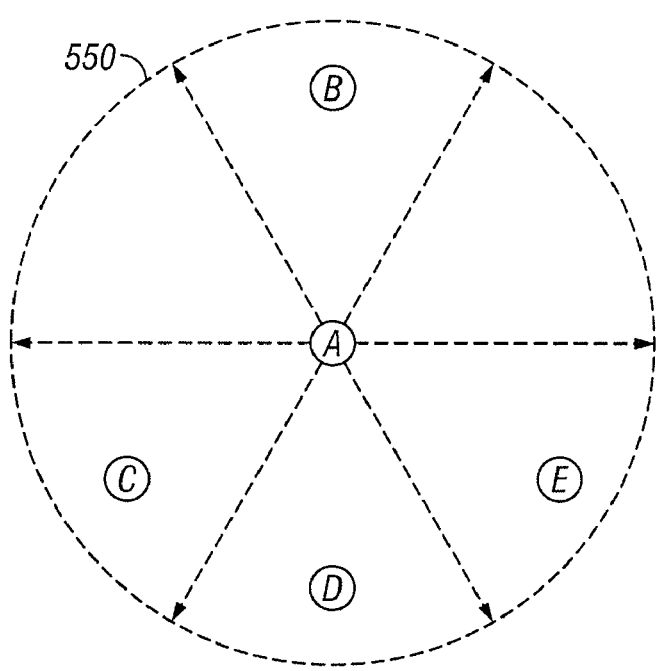
FIG. 5B is a diagram illustrating a low-rate omni-directional channel used in the network of FIG. 4.

The low-rate channel may be omni-directional, as shown in FIG. 5B. In FIG. 5B, the station A has a low-rate channel 550 for communication with the neighboring stations B-E. When sending information to the neighboring stations B-E, the station A can send the information simultaneously to the neighboring stations B-E via the low-rate channel 550. In addition, the information can be sent to other stations as long as the other stations are within the range of the low-rate channel. In another embodiment, the low-rate channel may be directional. In certain embodiments, the low-rate channel can be either directional or omni-directional, depending on the transmission needs. In some embodiments, the low-rate channel can be omni-directional as a default, and optionally directional.

In one embodiment, the high-rate channel may be used to transmit data, information, or certain control messages. The data can be audio, video, and/or textual data in any suitable form. The data can be compressed or uncompressed. The data may be in an encrypted or unencrypted form. When sending data or information via the high-rate channel, a multi-hop scheme may be used because the high-rate channel is directional, and has a shorter range. The control messages can include neighbor discovery control messages.

The low-rate channel may be used to transmit control signals. The control signals may be those used for reservation and allocation of radio sources used in the high-rate channel. For example, at least some of the control signals can be used for reservation of contention free period for data transmission, beacon transmission, and other control messages.

In certain instances, there is a need for transmission of information from a station to a plurality of stations on the multi-hop network. Such transmission of information can be referred to as "broadcasting." Broadcasting may be emulated by multiple high-rate channels in the network, using a multi-hop scheme. However, broadcasting via the high-rate channels may take long time if information needs to be transmitted to substantially all stations on the network. This is because at least some stations need to schedule multiple unicast transmissions to their neighboring stations in order to emulate broadcasting information across the network. Thus, the high-rate channels, if used for broadcasting information, involve latency that increases with an increase in the number of neighboring stations and a total number of stations in the network.

In one embodiment, the low-rate channel can also be used for information transmission that would involve latency if the high-rate channels were used. For example, the low-rate channel may be used for broadcasting information to substantially all of the stations on the network. The low-rate channel may be omni-directional and have a sufficiently long range to cover the entire network. Thus, a station or access point can send information simultaneously to other stations in the network. Thus, the low-rate channel may be more efficient in broadcasting information across the network than the high-rate channel. In certain situations, however, if information to be broadcast has too large to be carried over the low-rate channel, the high-rate channel can be employed for broadcasting the information to achieve higher efficiency.

As described above, each of the stations on the network needs an up-to-date network map to set up a route for transmitting information or data to another station. One or more of the stations can use the low-rate channel for broadcasting at least part of a network map or an update to the network map to substantially all the other devices on the network, as will be described below in more detail.

In certain embodiments, the low-rate channel may also be used for transmitting data. For example, when the high-rate channel is in a good condition, a source station can send a destination station data (for example, uncompressed data) over the high-rate channel. The high-rate channel which is directional can be easily blocked. In another instance where either or both of the source and destination stations are moving, the stations may lose wireless connectivity established over the high-rate channel. In these circumstances, the source station may reduce the size of the data by, for example, at least partially compressing the data, and transmit the data over the low-rate channel to the destination station.

Figure 6:
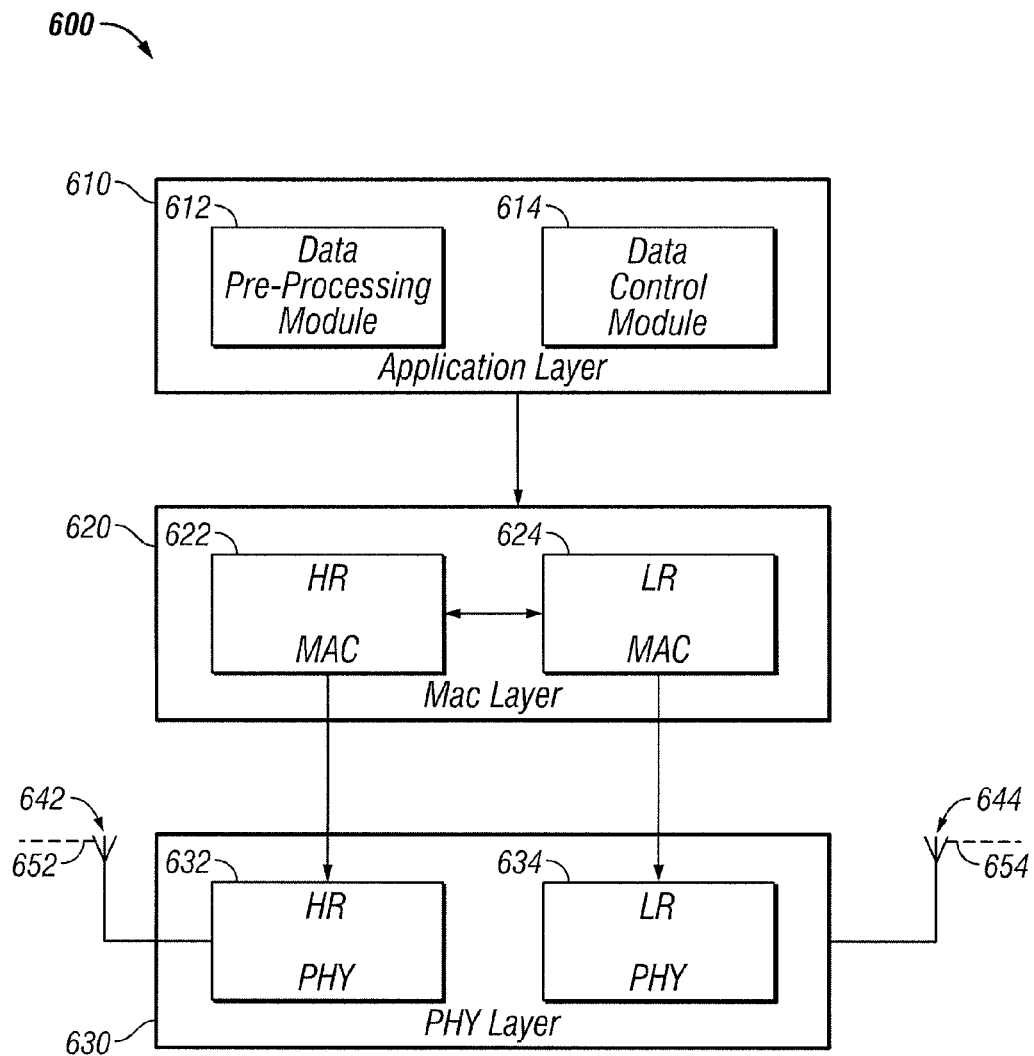
FIG. 6 is a block diagram of a wireless station using a high-rate channel and a low-rate channel according to one embodiment.

Referring to FIG. 6, a wireless station that can communicate with other stations or an access point in a multi-hop network via a high-rate channel and a low-rate channel according to one embodiment will be described below. The illustrated wireless station 600 may serve as a transmitter, and includes an application layer 610, a medium access control (MAC) layer 620, and a physical (PHY) layer 630, and a first antenna system 642, and a second antenna system 644.

The application layer 610 may include a data pre-processing module 612 and a data control module 614. The data pre-processing module 612 can perform pre-processing of data, such as partitioning of data. The data control module 614 provides a standard way to exchange data handling information such as capability information. For example, before a connection begins, the data control module 614 negotiates the data formats to be used, and when the need for the connection is completed, data control commands are used to stop the connection.

The MAC layer 620 controls how the station 600 gains access to data and permission to transmit it over the network. MAC layer 620 also serves to process data from the application layer 610 to form packets suitable for wireless transmission. The illustrated MAC layer 620 includes a high-rate (HR) MAC module 622 and a low-rate (LR) MAC module 624. The high-rate MAC module 622 controls how the station gains access to data and permission to transmit it over a high-rate channel 652. The low-rate MAC module 624 controls how the station gains access to control information or broadcast information, and permission to transmit it over a low-rate channel 654.

In the illustrated embodiment, the HR MAC module 622 and the LR MAC module 624 can communicate with each other for broadcasting information over the network, as will be described below. The HR MAC module 622 can transfer information to be broadcasted to the LR MAC module 624. The LR MAC module 624 can send the HR MAC module 622 a notification of completion of broadcasting information. The detailed method of broadcasting information will be described below.

The PHY layer 630 serves to further process the data packets from the MAC layer 620, and send them over wireless channels. The illustrated PHY layer 630 includes a high-rate (HR) PHY module 632 and a low-rate (LR) PHY module 634. The high-rate PHY module 632 adds PHY headers to the data packets, and sends the packets over the high-rate channel 652 via the first antenna system 642. The first antenna system 642 may be capable of directional transmission and/or reception. The low-rate PHY module 632 adds PHY headers to the control or broadcast information, and sends the information over the low-rate channel 654 via the second antenna system 644. The second antenna system may be capable of omni-directional and/or directional transmission and/or reception. In certain embodiments, the second antenna system 644 is configured to perform omni-directional transmission/reception as a default and to optionally provide directional transmission/reception.

Alternatively, the illustrated wireless station 600 may serve as a receiver. When serving as a receiver, the application layer 610, the MAC layer 620, and the PHY layer 630 of the station 600 can perform an inverse processing method of the layers 610-630 to regenerate data from data packets transmitted from another station over the wireless channels. A skilled technologist will appreciate that the configuration of the station can vary widely, depending on the design of the station as long as the station can send data and control/broadcast information via a high rate channel and a low-rate channel, as described above.

The HR MAC module 622, the HR PHY module 632, and the first antenna system 642 of the station 600 form a high-rate plane together with those of the other stations and access point in the network. The LR MAC module 624, the LR PHY module 634, and the second antenna system 644 of the station 600 form a low-rate plane together with those of the other stations and access point in the network.

In certain embodiments, the high-rate plane may be used for transmitting data and/or control signals. For example, the HR MAC module 622 may decide which messages are important or delay sensitive, and need to be quickly disseminated in the network. The low-rate plane may also be used for transmitting data and/or control signals.

Although not illustrated, the access point AP of the multi-hop network may include an application layer, a MAC layer, and a PHY layer, the configurations of which can be as described above with respect to FIG. 6. The access point may also include a routing module for connecting to a backbone. The routing module can provide a wired or wireless connection to the backbone, depending on the design of the network to which the access point belongs.

Figure 7A:
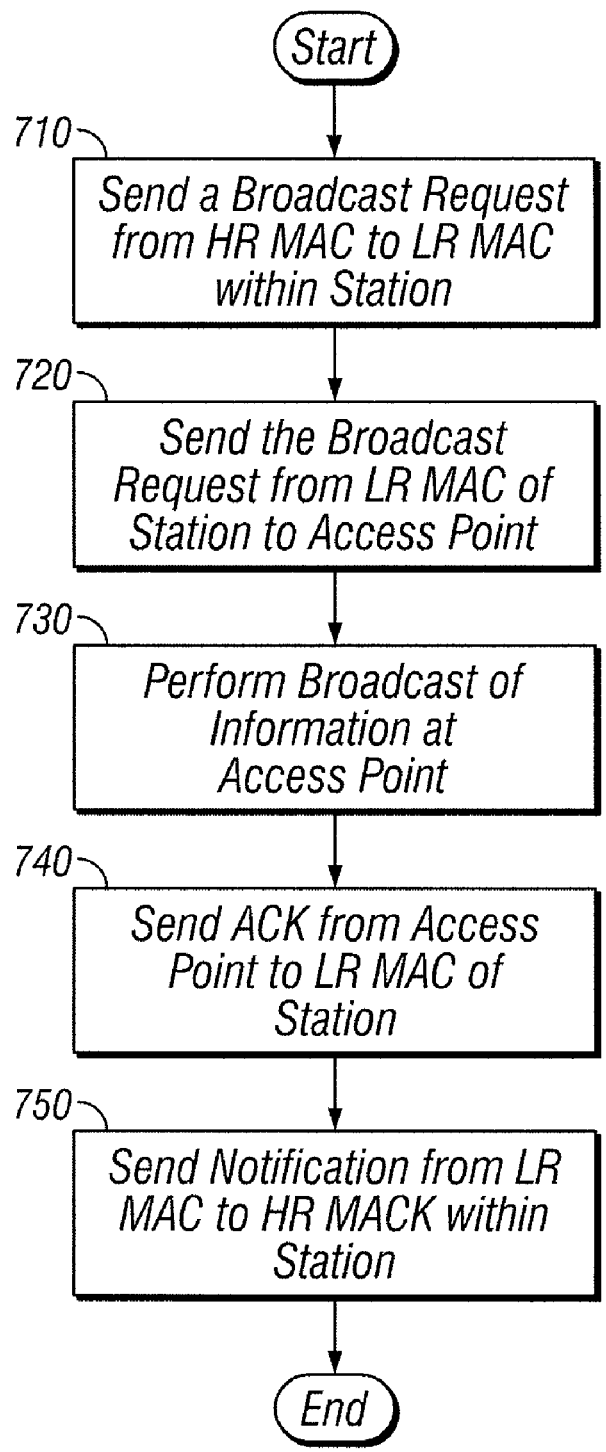
FIG. 7A is a flowchart illustrating one embodiment of a method for broadcasting information over a low-rate channel.
Figure 7B:
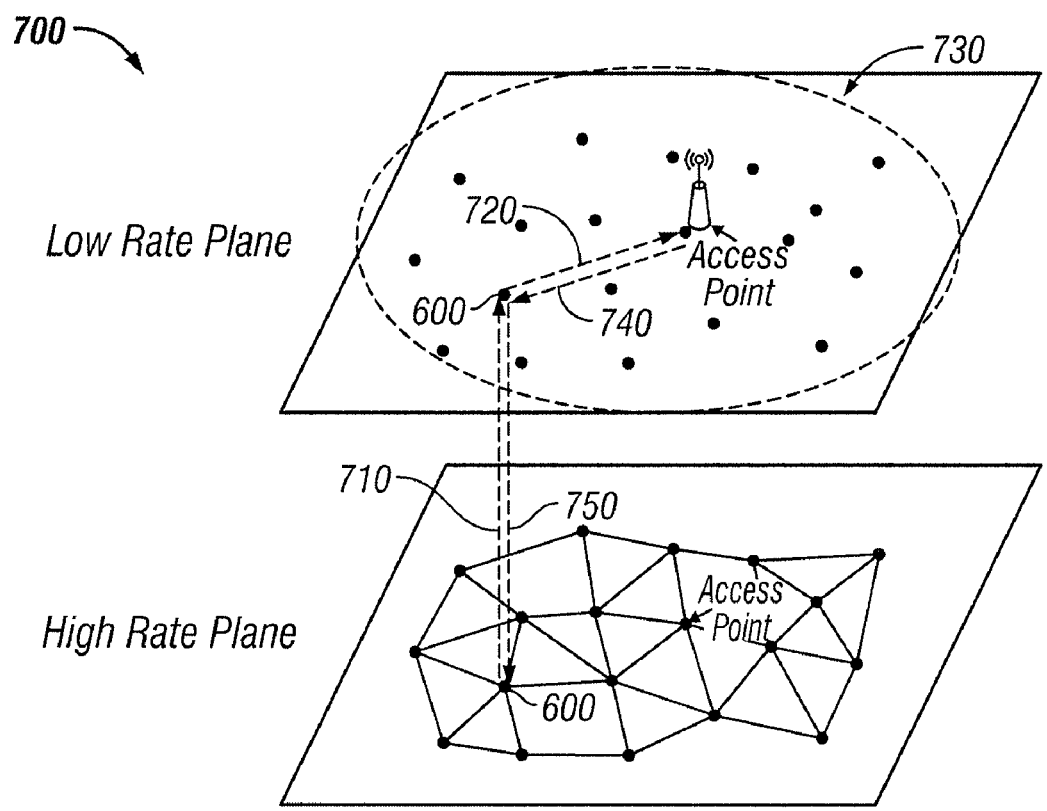
FIG. 7B is a diagram illustrating the method for broadcasting information over a low-rate channel of FIG. 7A.

Referring to FIGS. 6, 7A, and 7B, a method of broadcasting information over a multi-hop network 700 (FIG. 7B) according to one embodiment will be described below. At block 710 of FIG. 7A, the HR MAC module 622 of the station 600 sends the LR MAC module 624 of the station 600 a broadcast request along with information to be broadcasted over the network. The information may include at least part of a network map or an update to the network map. This block 710 in FIG. 7A serves to transfer the information from the HR plane to the LR plane, as indicated by 710 in FIG. 7B.

Then, the LR MAC module 624 of the station 600 sends a unicast signal to the access point AP of the network 700 via the LR PHY module 634, the omni-directional antenna system 644, and the LR channel 654 at block 720 of FIG. 7A. The unicast signal can include the broadcast request and the information to be broadcasted. This block 720 in FIG. 7A serves to transfer the request and the information from the station 600 to the access point AP on the LR plane, as indicated by 720 in FIG. 7B.

Subsequently, the access point AP performs broadcasting the information across the network via the low-rate channel at block 730. The information is broadcast from the access point on the LR plane, as indicated by 730 in FIG. 7B.

The access point AP may reserve the LR channel before scheduling the broadcast. In one embodiment where the low-rate plane transmission is in compliance with IEEE 802.11 standard, the access point can use a clear-to-send to self (CTS-to-self) signal to reserve the low-rate channel before scheduling the broadcast. Alternatively, before sending the request to the access point AP, the station 600 may reserve a transmission opportunity TXOP that is sufficiently long for transmitting the request and the following broadcast from the access point AP.

Figure 9:
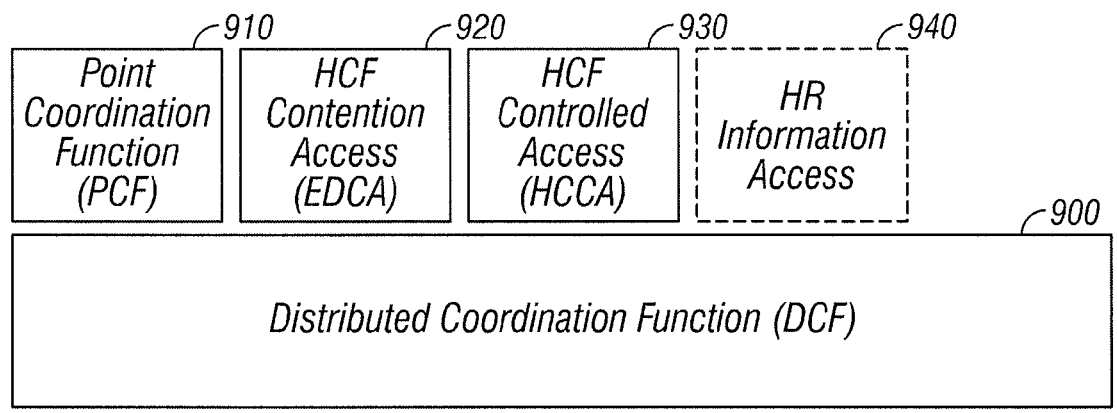
FIG. 9 is a block diagram illustrating MAC architecture including a dedicated low-rate channel function for broadcasting a high-rate channel-related information.

In another embodiment where the low-rate plane transmission is in compliance with IEEE 802.11 standard, the Distributed Coordination Function (DCF) of the MAC architecture of the station 600 may provide high-rate information access function. Under IEEE 802.11 standard, different access schemes are possible such as the Distributed Coordination Function (DCF) 900, Point Coordination Function (PCF) 910, Hybrid Coordination Function (HCF) Contention Access (EDCA) 920, and HCF Controlled Access (HCCA) 930. In addition to these functions specified by EEEE 802.11 standard, the access scheme can also include the high-rate information access function 940 next to the HCCA, as shown in FIG. 9. This high-rate information access function 940 provides a dedicated duration for transmission of information related to the high-rate channel. Details of the DCF, PCF, EDCA, and HCCA are disclosed in IEEE 802.11 (for example, Chapter 9, MAC sublayer functional description of IEEE 802.11™-2007 which is incorporated herein by reference). During the dedicated duration of the high-rate information access function 940, the access point AP may broadcast information over the network, and thus scheduling the broadcast is not necessary.

Upon completing broadcasting the information, the access point AP sends the LR MAC module 624 of the station 600 an acknowledgment signal via the LR channel 654, the omni-directional antenna system 644, and the LR PHY module 634 at block 740. The acknowledgment signal is transmitted on the LR plane, as indicated by 740 in FIG. 7B.

Upon receiving the acknowledgment signal from the access point AP, the LR MAC module 624 of the station 600 sends the HR MAC module 622 a notification indicating the completion of broadcasting the information at block 750. This notification is sent from the LR plane to the HR plane, as indicated by 750 in FIG. 7B.

Figure 8A:
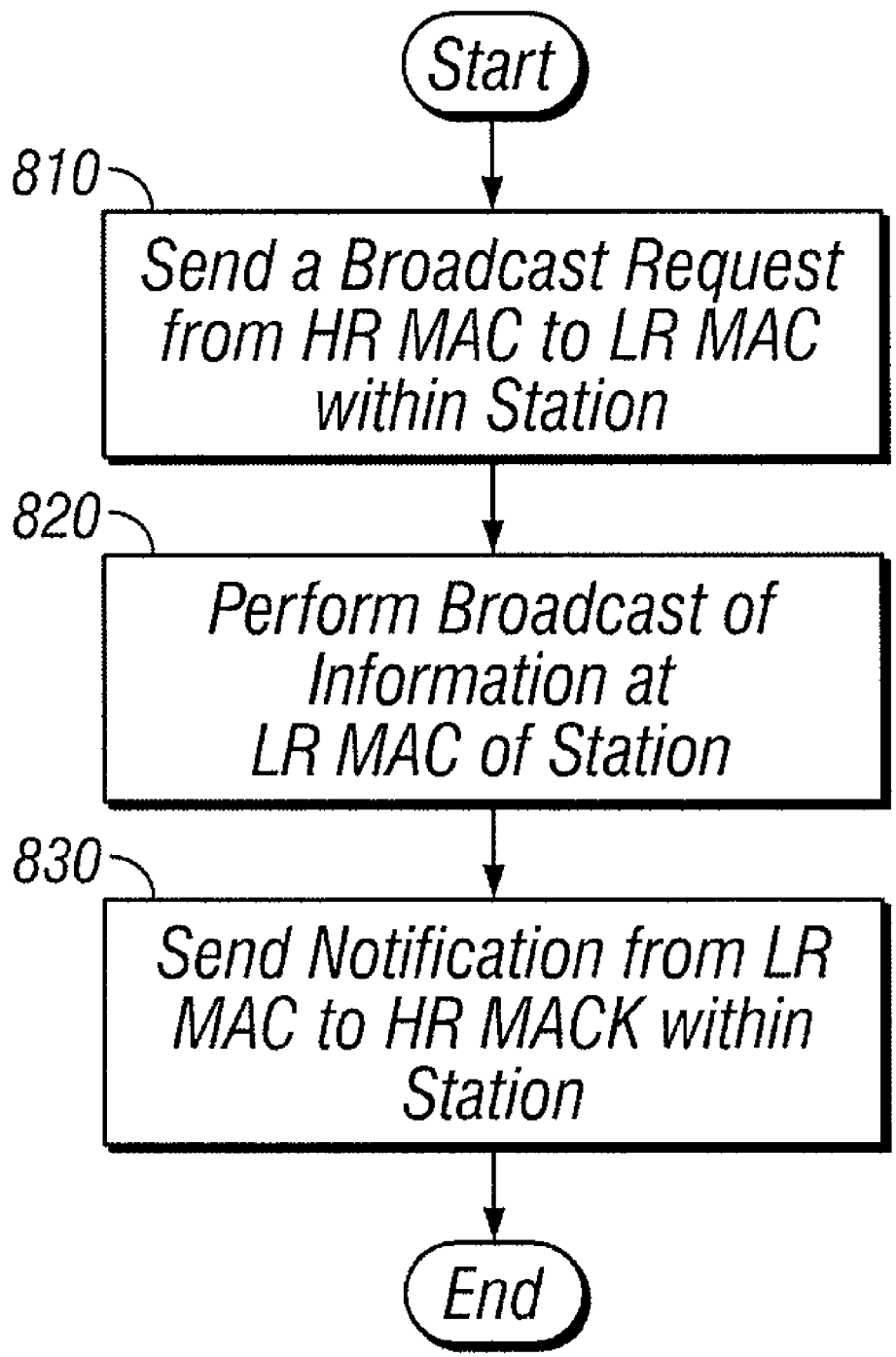
FIG. 8A is a flowchart illustrating another embodiment of a method for broadcasting information over a low-rate channel.
Figure 8B:
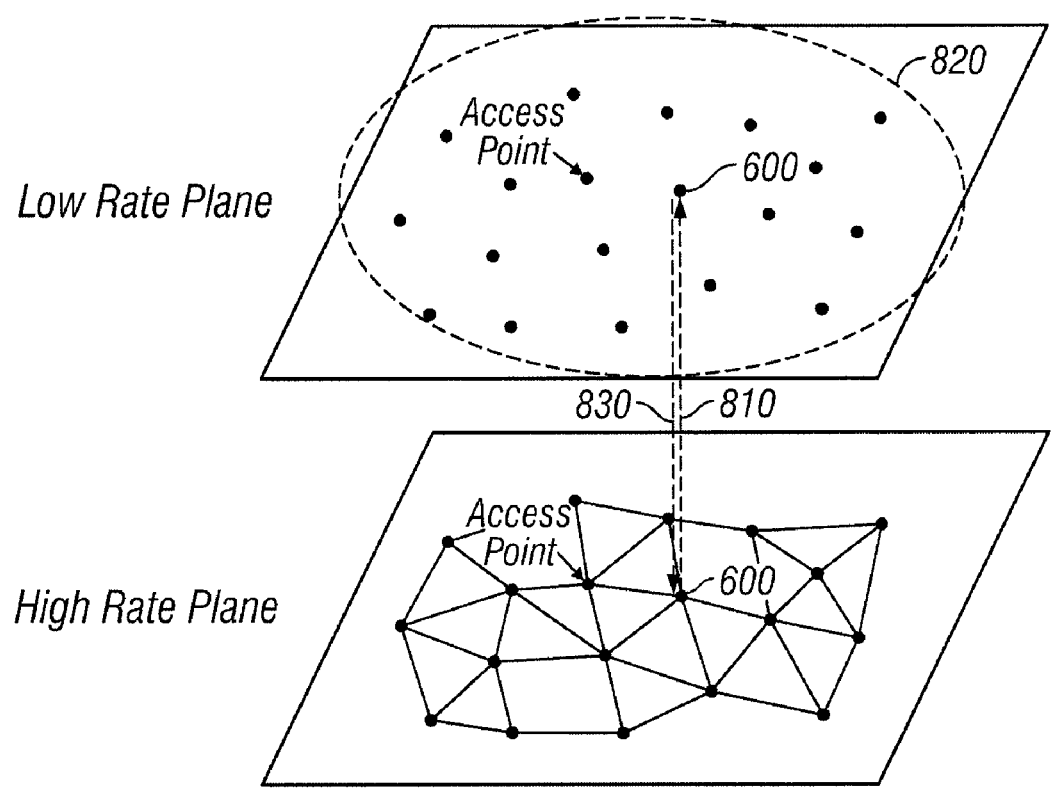
FIG. 8B is a diagram illustrating the method for broadcasting information over a low-rate channel of FIG. 8A.

Referring to FIGS. 6, 8A, and 8B, a method of broadcasting information over a multi-hop network 800 according to another embodiment will be described below. At block 810 of FIG. 8A, the HR MAC module 622 of the station 600 sends the LR MAC module 624 of the station 600 a broadcast request along with information to be broadcasted over the network 800. This block 810 in FIG. 8A transfers the request and the information from the HR plane to the LR plane, as indicated by 810 in FIG. 8B.

Subsequently, the LR MAC module 624 of the station 600 performs broadcasting the information across the network 800 via the low-rate channel at block 820. The information is broadcast from the omni-directional antenna system 644 of the station 600 on the LR plane, as indicated by 820 in FIG. 8B.

The LR MAC module 624 of the station 600 may reserve the LR channel before scheduling the broadcast. In one embodiment where the low-rate plane transmission is in compliance with IEEE 802.11 standard, the LR MAC module 624 of the station 600 can use a clear-to-send to self (CTS-to-self) signal to reserve the low-rate channel. In another embodiment where the low-rate plane transmission is in compliance with IEEE 802.11 standard, access schemes may include high-rate information access function in addition to the Distributed Coordination Function (DCF), Point Coordination Function (PCF), hybrid coordination function (HCF) Contention Access (EDCA), and HCF Controlled Access (HCCA) that are specified by the IEEE 802.11 standard, as described above with respect to FIG. 9.

Upon completing broadcasting the information, the LR MAC module 624 of the station 600 sends the HR MAC module 622 a notification indicating the completion of broadcasting the information at block 830. This notification is sent from the LR plane to the HR plane, as indicated by 830 in FIG. 8B.

The embodiment described above in connection with FIGS. 8A and 8B may be used where the broadcasting station is located at a position that allows the station to broadcast the information. For example, the embodiment can be used where the station is in substantially the middle of the network coverage area and its omni-directional antenna can provide a signal to substantially all the other stations in the network. If, however, the broadcasting station is not located at such a position, the station can opt to use the scheme described above in connection with FIGS. 7A and 7B.

The information broadcasted by the schemes described above can be used in the network to enhance the performance of data transmission in the network. A method of using broadcast information across the network to provide a high throughput according to one embodiment will be described below.

In the embodiment described above with respect to FIGS. 7A and 7B, the access point AP has the complete network information or map (e.g., neighbor information of all stations or high-rate channel information). Thus, the access point AP can optimally provide a route for data transmission between two stations. The access point AP can also optimally adjust the assignment of contention free time division multiple access (TDMA) slots. For example, the access point AP may allocate data periods on a high-rate channel, depending on the channel condition and availability.

Figure 10:
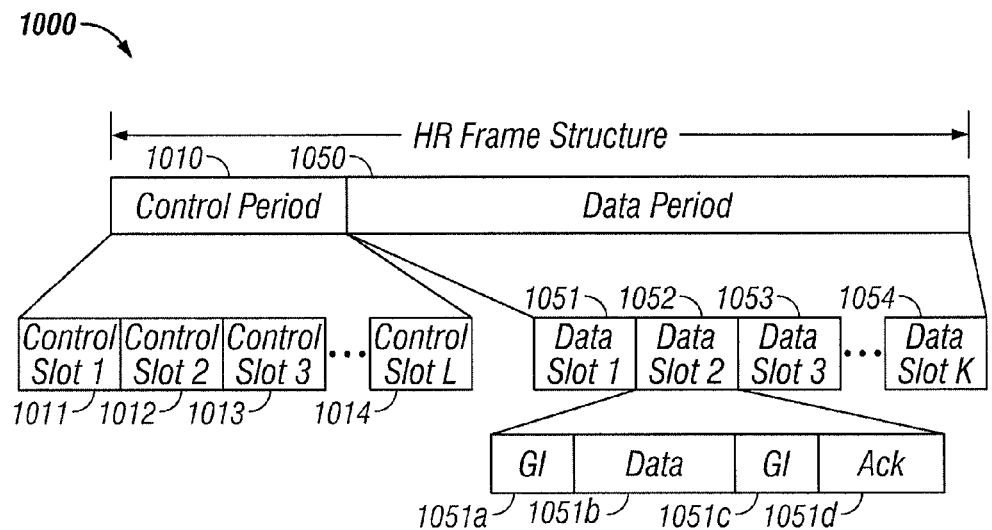
FIG. 10 is a frame format for time allocation of a high rate channel according to one embodiment.

Referring to FIG. 10, one embodiment of a high-rate MAC superframe structure will be described below. The superframe 1000 includes a control period 1010 and a data period 1020. The control period 1010 includes a first to an L-th control slots 1011-1014 for control messages for, for example, neighbor discovery and other contention-based messages. The data period 1050 includes a first to a K-th data slots 1051-1054 for data transmission. Each of the data slots 1051-1054 includes a first guard interval (GI) duration 1051*a*, a data duration 1051*b*, a second guard interval duration 1051*c*, and an acknowledgment duration 1051*d*. The GI durations 1051*a*, 1051*c* serve to accommodate the propagation delay and/or allow stations to have mode transition time for changing their modes from the transmission mode to the receipt mode or vice versa in their radio hardware. The data duration 1051*b* provides a duration for transmitting a data frame or packet. The acknowledgment duration 1051*d* accommodates time required for the receiving station to transmit an acknowledgment signal ACK to acknowledge the receipt of the data frame.

Figure 11:
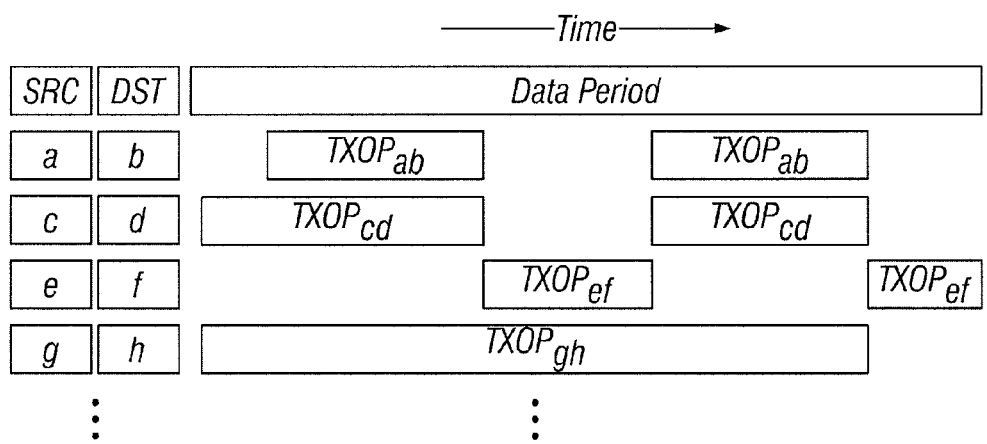
FIG. 11 is a timing diagram illustrating transmission opportunity allocation for high rate channels according to one embodiment.

In order to provide more flexible reserved periods, the access point AP may assign variable length transmission opportunities TXOPs, depending on whether there is spatial interference between transmissions. In one embodiment, the access point AP may allocate overlapping data slots (or TXOPs) during a data period to stations that are spatially separated from one another such that high-rate directional transmissions do not interfere with one another. In another embodiment, the access point AP may allocate overlapping data slots (or TXOPs) to neighboring stations that have distinct directional beams. For example, referring to FIG. 11, stations a and b can have TXOPs overlapping with TXOPs between stations c and d, and a TXOP between stations g and h. In this manner, the access point AP can provide an optimal allocation of the TXOPs between the stations within the network based on the complete network information, thereby enhancing the overall transmission performance of the network.

Figure 12:
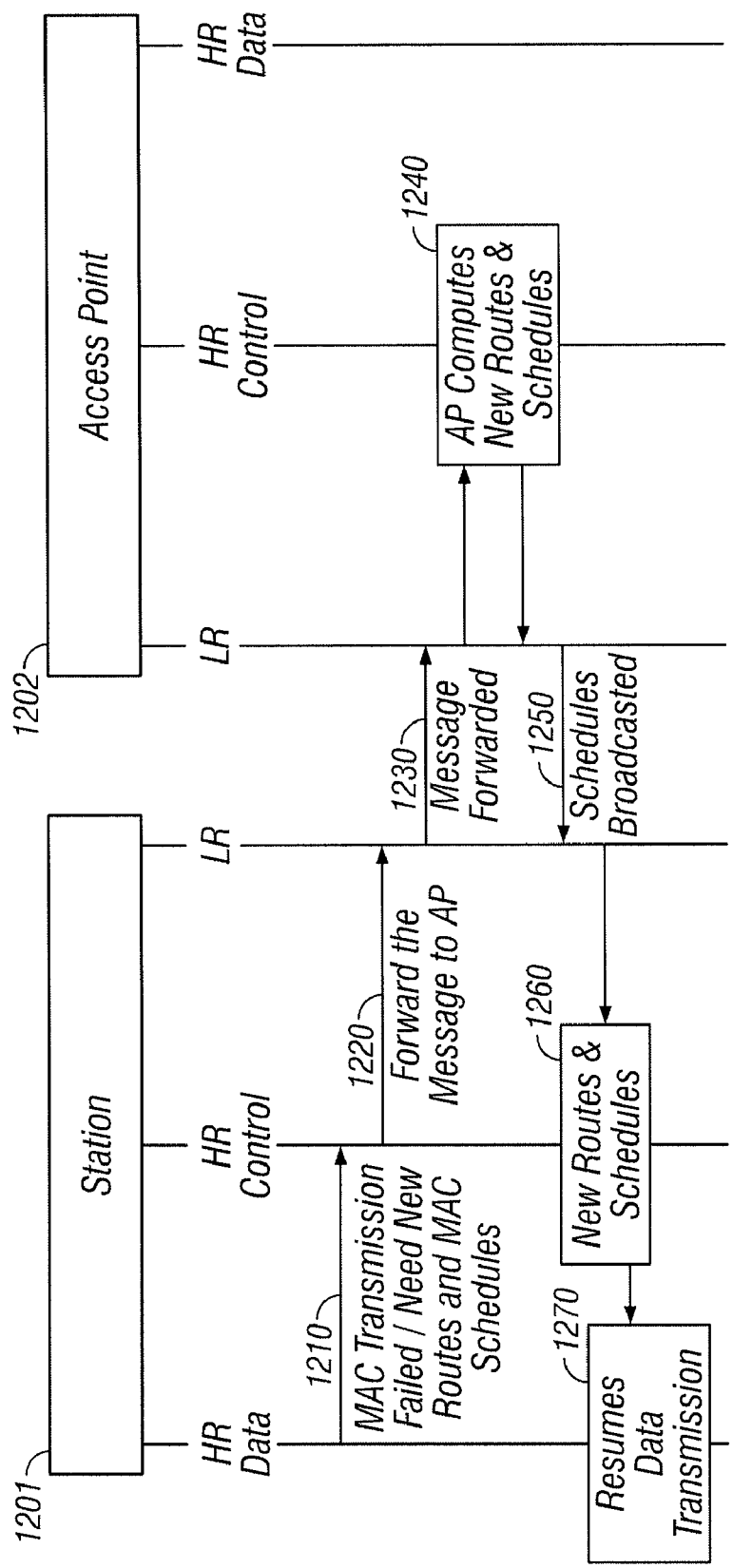
FIG. 12 is a diagram illustrating one embodiment of a method of updating a network map.

Referring to FIG. 12, a method of maintaining an up-to-date network map according to one embodiment will be described. As described above, the high-rate channel can be easily blocked due to some channel obstruction by, for example, a human or pet movement or any object (e.g., furniture) located between stations.

In the illustrated embodiment, a station 1201 in a multi-hop network, upon detecting no response from a neighboring hop station for data transmission, can send a notification to that effect to an access point 1202 of the network via a low-rate channel. For example, if data transmission over the high-rate channel fails, as indicated by 1210, a high-rate control module sends a failure message to a low-rate control module, as indicated by 1220. The low-rate control module sends the message to the low-rate module of the access point via a low-rate channel, as indicated by 1230. Then, the access point 1202 can re-compute the data transmission (end-to-end or partial) paths and MAC schedules, as indicated by 1240. The access point 1202 informs all the stations in the network of the updated schedule and routes via the low-rate channel, as indicated by 1250.

Since the access point 1202 maintains an up-to-date network map, the access point 1202 can proactively re-compute routes if any stations which have been originally scheduled on the path have recently moved away or have poor channel conditions. Upon receiving the updated schedule and routes, the station 1201 can resume data transmission, as indicated by 1260 and 1270.

In other embodiments, it is possible to use the similar process in the context of distributed routing or MAC reservation protocols. In such embodiments, there is no coordinating entity, such as an access point. Each station may perform route maintenance independently. However, the process described above with reference to FIG. 12 can be adapted for such embodiments.

The embodiments described above may be used for data (e.g., video data and audio data) streaming over a wireless network. For example, the embodiments may be adapted for transmission of uncompressed video in the same range as a wireless local area network (WLAN) under IEEE 802.11 standard. The embodiments can also be adapted for a wireless system having a very high throughput (VHT) of about 0.5 Gbps to about 4 Gbps. In other arrangements, the embodiments can be adapted for a wireless system having a bandwidth of 60 GHz, while supporting IEEE 802.11 standard.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A wireless device for data transmission, the device comprising:
   a transmitter configured for wirelessly communicating with an access point and a plurality of other wireless devices, wherein the access point, the wireless device, and the plurality of other wireless devices form at least part of a multi-hop wireless network, wherein the transmitter comprises:
- a first module configured for sending data and/or one or more control messages over a first wireless channel having a first frequency and a first range; and
- a second module configured for sending one or more control signals over a second wireless channel having a second frequency lower than the first frequency, the second wireless channel having a second range greater than the first range, wherein the second module is further configured for sending network information to the access point via the second wireless channel, the network information including a request for broadcasting at least part of the network information over the multi-hop wireless network, wherein data is communicated between a first wireless device and a second wireless device during a first transmission period, and between a third wireless device and a fourth wireless device during a second transmission period, based at least partly on a network map.

2. The device of claim 1, wherein the first module is configured for sending the data and/or the control messages using a first antenna system that is capable of directional transmission, and wherein the second module is configured for sending the control signals and/or the network information using a second antenna system that is capable of omni-directional and/or directional transmission.

3. The device of claim 2, wherein the second antenna system is configured for providing omni-directional transmission as a default and for optionally providing directional transmission.

4. The device of claim 1, wherein the first frequency is about 6 GHz or greater.

5. The device of claim 1, wherein the second frequency is about 6 GHz or lower.

6. The device of claim 5, wherein the second frequency is about 2.4 GHz or about 5 GHz.

7. The device of claim 1, wherein the first module is further configured for generating the network information and send the network information to the second module.

8. The device of claim 1, wherein the second module is further configured for receiving an acknowledgment signal over the second wireless channel, the acknowledgment signal being indicative of a completion of broadcasting the network information by the access point, and wherein the second module is further configured for notifying the first module of the completion of broadcasting the network information.

9. The device of claim 1, wherein the network information comprises at least part of the network map and/or an update to the network map.

10. The device of claim 9, wherein the network map comprises at least one of a location, identification, channel condition, or availability of at least one of the wireless devices spatially neighboring the wireless device in the network.

11. The device of claim 1, wherein the second module is further configured for sending data over the second wireless channel.

12. The device of claim 11, wherein the second module is configured for sending the data using an antenna system that is capable of onmi-directional and/or directional transmission.

13. The device of claim 11, wherein the first module is configured for sending uncompressed data over the first wireless channel, and wherein the second module is configured for sending at least partially compressed data over the second wireless channel.

14. The device of claim 11, wherein the data comprises at least one of audio data and video data.

15. The device of claim 1, wherein the access point is further configured for scheduling a first data transmission over the third wireless channel between the first and second wireless devices during the first transmission period, and a second data transmission over the fourth wireless channel between the third and fourth wireless devices during the second transmission period, based at least partly on the network map.

16. A wireless device for data transmission, the device comprising:
- a receiver configured for wirelessly communicating with an access point and a plurality of other wireless devices, wherein the access point, the wireless device, and the plurality of other wireless devices form at least part of a multi-hop wireless network, wherein the receiver comprises:
  - a first module configured for receiving data and/or one or more control messages over a first wireless channel having a first frequency and a first range; and
  - a second module configured for receiving one or more control signals over a second wireless channel having a second frequency lower than the first frequency, the second wireless channel having a second range greater than the first range, wherein the second module is further configured for receiving information on the multi-hop wireless network from the access point via the second wireless channel, wherein data is communicated between a first wireless device and a second wireless device during a first transmission period, and between a third wireless device and a fourth wireless device during a second transmission period, based at least partly on a network map.

17. An access point device for wireless data communication, the access point device being configured for wirelessly communicating with a plurality of wireless devices, wherein the access point and the plurality of wireless devices form at least part of a multi-hop wireless network, the access point device comprising:
- a first module configured for sending or receiving data and/or one or more control messages over a first wireless channel having a first frequency and a first range; and
- a second module configured for sending or receiving one or more control signals over a second wireless channel having a second frequency lower than the first frequency, the second wireless channel having a second range greater than the first range, wherein the second module is further configured for receiving network information from one of the wireless devices via the second wireless channel, wherein the second module is further configured for broadcasting the network information over the multi-hop wireless network via the second wireless channel, wherein data is communicated over a third wireless channel between a first wireless device and a second wireless device during a first transmission period, and over a fourth wireless channel between a third wireless device and a fourth wireless device during a second transmission period, based at least partly on a network map.

18. The access point device of claim 17, wherein the access point is further configured for exchanging data with another access point of another network via a wired or wireless backbone.

19. The access point device of claim 17, wherein the first module is configured for sending or receiving the data and/or the control messages using a first antenna system that is capable of directional transmission, wherein the second module is configured for sending or receiving the control signals and/or the network information using a second antenna system that is capable of omni-directional and/or directional transmission, and wherein the second module is further configured for broadcasting the network information using the second antenna system.

20. The access point device of claim 19, wherein the second antenna system is configured for providing omni-directional transmission as a default and to optionally provide directional transmission.

21. The access point device of claim 17, wherein the first frequency is about 6 GHz or greater, and wherein the second frequency is about 6 GHz or lower.

22. The access point device of claim 17, wherein the network information comprises at least part of the network map and/or an update to the network map.

23. The access point device of claim 22, wherein the network map comprises at least one of a location, ID, channel condition or availability of at least one of the wireless devices.

24. The access point device of claim 22, wherein the plurality of wireless devices comprise first to fourth wireless devices,
wherein the access point is further configured to schedule a first data transmission over a third wireless channel between the first and second wireless devices during a first transmission period, and a second data transmission over a fourth wireless channel between the third and fourth wireless devices during a second transmission period, based at least partly on the network map,
wherein each of the third and fourth wireless channels is directional and has the same frequency as the first frequency,
wherein the third and fourth wireless channels are spatially separated from each other, and
wherein the first and second transmission periods are at least partially overlapping with each other.

25. The access point device of claim 17, wherein the second module is further configured for sending the one of the wireless devices an acknowledgment signal after completing broadcasting the network information.

26. A method of wireless communication, the method comprising:
generating network information, by a first module of a wireless device, the first module being configured for processing data and/or one or more control messages for transmission over a first wireless channel having a first frequency and a first range, the network information including a request for broadcasting at least part of the network information to a plurality of other wireless devices, wherein an access point, the wireless device, and the plurality of other wireless devices form at least part of a multi-hop network; and
transmitting, by a second module of the wireless device, the network information to the access point over a second wireless channel having a second frequency lower than the first frequency, the second wireless channel having a second range greater than the first range,
wherein data is communicated over a third wireless channel between a first wireless device and a second wireless device during a first transmission period, and over a fourth wireless channel between a third wireless device and a fourth wireless device during a second transmission period, based at least partly on a network map.

27. The method of claim 26, wherein the first module is configured for sending or receiving the data and/or the control messages using a first antenna system that is capable of directional transmission, and wherein transmitting the network information comprises using a second antenna system that is capable of omni-directional and/or directional transmission.

28. The method of claim 26, wherein the first frequency is about 6 GHz or greater, and wherein the second frequency is about 6 GHz or lower.

29. The method of claim 26, further comprising:
receiving, by the second module, an acknowledgment signal over the second wireless channel, the acknowledgment signal being indicative of a completion of broadcasting the at least part of the network information by the access point; and
notifying, by the second module, the first module of the completion of broadcasting the network information.

30. The method of claim 26, wherein the network information comprises at least part of a network map and/or an update to the network map.

31. The method of claim 26, further comprising transmitting, by the second module, data over the second wireless channel.

32. A method of wireless communication, the method comprising:
receiving, by an access point, network information over a first wireless channel having a first frequency and a first range, wherein the access point is configured for communicating data and/or one or more control messages with at least one of a plurality of wireless devices over a second wireless channel having a second frequency higher than the first frequency and a second range shorter than the first range, wherein the access point and the plurality of wireless devices form at least part of a multi-hop wireless network, the network information originating from one of the wireless devices;
transmitting, by the access point, the network information to substantially all of the wireless devices over the first wireless channel; and
communicating data over a third wireless channel between a first wireless device and a second wireless device during a first transmission period, and over a fourth wireless channel between a third wireless device and a fourth wireless device during a second transmission period, based at least partly on a network map.

33. The method of claim 32, wherein receiving the network information comprises using an antenna system that is capable of onmi-directional and/or directional transmission, and wherein transmitting the network information comprises using the antenna system.

34. The method of claim 32, wherein the first frequency is about 6 GHz or lower, and wherein the second frequency is about 6 GHz or greater.

35. The method of claim 32, wherein the network information comprises at least part of the network map and/or an update to the network map.

36. The method of claim 35, wherein the network map comprises at least one of a location, ID, channel condition and availability of at least one of the wireless devices.

37. The method of claim 35, wherein the plurality of wireless devices comprise first to fourth wireless devices, wherein the method further comprises:
scheduling, by the access point, a first data transmission over the third wireless channel between the first and second wireless devices during the first transmission period, and a second data transmission over the fourth wireless channel between the third and fourth wireless devices during the second transmission period, based at least partly on the network map, wherein each of the third and fourth wireless channels is directional and has the same frequency as the second frequency, wherein the third and fourth wireless channel are spatially separated from each other, and wherein the first and second transmission periods are at least partially overlapping with each other.

38. The method of claim 32, further comprising transmitting, by the access point, an acknowledgment signal to the one of the wireless devices after transmitting the network information.

39. A wireless network comprising:
an access point; and
a plurality of wireless devices configured for wirelessly communicating with one another and with the access point, wherein the access point and the plurality of wireless devices form at least part of a multi-hop wireless network; wherein each of the access point and the plurality of wireless devices comprises:
 a first module configured for sending or receiving data and/or one or more control messages over a first wireless channel having a first frequency and a first range; and
 a second module configured for sending or receiving one or more control signals over a second wireless channel having a second frequency lower than the first frequency, the second wireless channel having a second range greater than the first range,
wherein the second module of at least one of the wireless devices is further configured for sending network information to the access point via the second wireless channel, and
wherein the access point is further configured for transmitting the network information over the multi-hop wireless network via the second wireless channel and for communicating data over a third wireless channel between a first wireless device and a second wireless device during a first transmission period, and over a fourth wireless channel between a third wireless device and a fourth wireless device during a second transmission period, based at least partly on a network map.

40. The network of claim 39, wherein the network information comprises at least part of a network map and/or an update to the network map.

41. An access point device for wireless data communication in a multi-hop wireless network comprising:
 a first module configured for sending or receiving data or control messages over a first wireless channel having a first frequency and a first range; and
 a second module configured for sending or receiving one or more control signals over a second wireless channel having a second frequency lower than the first frequency, the second wireless channel having a second range greater than the first range,
wherein the second module is further configured for receiving network information from one of a plurality of wireless devices in the wireless multi-hop network via the second wireless channel,
wherein the second module is further configured for broadcasting the network information over the multi-hop wireless network via the second wireless channel,
wherein the plurality of wireless devices comprise first to fourth wireless devices,
wherein the access point is further configured for scheduling a first data transmission over a third wireless channel between the first and second wireless devices during a first transmission period, and a second data transmission over a fourth wireless channel between the third and fourth wireless devices during a second transmission period, based at least partly on a network map, and
wherein each of the third and fourth wireless channels is directional and has the same frequency as the first frequency.

42. A method of wireless communication, the method comprising:
 receiving, by an access point, network information over a first wireless channel having a first frequency and a first range, wherein the access point is configured for communicating data and/or one or more control messages with at least one of a plurality of wireless devices over a second wireless channel having a second frequency higher than the first frequency and a second range shorter than the first range, wherein the access point and the plurality of wireless devices form at least part of a multi-hop wireless network, the network information originating from one of the wireless devices;
 transmitting, by the access point, the network information to substantially all of the wireless devices over the first wireless channel, and
 scheduling, by the access point, a first data transmission over a third wireless channel between the first and second wireless devices during a first transmission period, and a second data transmission over a fourth wireless channel between the third and fourth wireless devices during a second transmission period, based at least partly on a network map,
wherein each of the third and fourth wireless channels is directional and has the same frequency as the second frequency.

* * * * *